United States Patent
Clark

(10) Patent No.: US 8,244,211 B2
(45) Date of Patent: Aug. 14, 2012

(54) MOBILE ELECTRONIC SECURITY APPARATUS AND METHOD

(75) Inventor: Garrett Clark, Melbourne, FL (US)

(73) Assignee: Inflexis LLC, W. Melbourne, FL (US)

(*) Notice: Subject to any disclaimer, the term of this patent is extended or adjusted under 35 U.S.C. 154(b) by 712 days.

(21) Appl. No.: 12/366,414

(22) Filed: Feb. 5, 2009

(65) Prior Publication Data

US 2009/0203355 A1    Aug. 13, 2009

Related U.S. Application Data

(60) Provisional application No. 61/027,004, filed on Feb. 7, 2008.

(51) Int. Cl.
*H04M 1/68* (2006.01)

(52) U.S. Cl. ........ 455/411; 455/410; 713/186; 713/182; 713/172; 713/174

(58) Field of Classification Search ............... None
See application file for complete search history.

(56) References Cited

U.S. PATENT DOCUMENTS

| | | | |
|---|---|---|---|
| 6,256,737 B1* | 7/2001 | Bianco et al. ............... | 713/186 |
| 6,539,380 B1 | 3/2003 | Moran | |
| 6,886,095 B1 | 4/2005 | Hind et al. | |
| 7,272,723 B1 | 9/2007 | Abbott et al. | |
| 7,353,399 B2 | 4/2008 | Ooi et al. | |
| 7,424,134 B2 | 9/2008 | Chou | |
| 7,921,455 B2* | 4/2011 | Lin et al. ............... | 726/9 |
| 2002/0180586 A1 | 12/2002 | Kitson et al. | |
| 2003/0110382 A1 | 6/2003 | Leporini et al. | |
| 2005/0071646 A1 | 3/2005 | Hollingshead | |
| 2005/0097338 A1* | 5/2005 | Lee ............... | 713/186 |
| 2005/0169503 A1 | 8/2005 | Howell et al. | |
| 2006/0050931 A1 | 3/2006 | Oka | |

(Continued)

FOREIGN PATENT DOCUMENTS

JP    2007095022    4/2007

(Continued)

OTHER PUBLICATIONS

International Search Report and Written Opinion from corresponding International Application No. PCT/US09/33234.

*Primary Examiner* — Olumide T Ajibade Akonai
*Assistant Examiner* — Randy Peaches
(74) *Attorney, Agent, or Firm* — Renner, Otto, Boisselle & Sklar, LLP

(57) ABSTRACT

A mobile electronic security device may include a biometric sensor to measure a physical characteristic of a user, an interface component to operatively couple the electronic security device with another device, and a control circuit that are assembled as a single portable unit. Other components, such as a battery, a display, and a memory may be included in the security device. The security device authenticates the identity of a user using output data from the biometric sensor and, in some embodiments, using data from an environmental sensor. Once validated, an encrypted authentication certificate may be output to another device. The security device provides a trusted platform that enables a user to verify his or her identity, show proof of presence of the user, control access to data, etc., and may operate in a standalone manner and/or in conjunction with another device.

23 Claims, 4 Drawing Sheets

U.S. PATENT DOCUMENTS

| | | |
|---|---|---|
| 2006/0082808 A1 | 4/2006 | Borza |
| 2006/0105748 A1 | 5/2006 | Ooi et al. |
| 2006/0204047 A1 | 9/2006 | Dave et al. |
| 2007/0101434 A1 | 5/2007 | Jevans |
| 2007/0220274 A1 | 9/2007 | Jensen et al. |
| 2007/0239990 A1 | 10/2007 | Fruhauf et al. |
| 2008/0010453 A1 | 1/2008 | Hamid |
| 2008/0012701 A1* | 1/2008 | Kass et al. ............... 340/539.11 |
| 2008/0052528 A1 | 2/2008 | Poo et al. |
| 2008/0094926 A1 | 4/2008 | Neel |
| 2008/0120509 A1* | 5/2008 | Simon ........................ 713/186 |

FOREIGN PATENT DOCUMENTS

| | | |
|---|---|---|
| KR | 1020060122809 | 11/2006 |

* cited by examiner

MOBILE ELECTRONIC SECURITY APPARATUS AND METHOD

RELATED APPLICATION DATA

This application claims the benefit of U.S. Provisional Patent Application No. 61/027,004 filed Feb. 7, 2008, which is incorporated herein by reference in its entirety.

TECHNICAL FIELD

The present disclosure generally relates to a portable electronic security device and method of identity verification and access control.

BACKGROUND

A growing number of transactions involving sensitive personal or business information are now performed in an electronic medium. Unfortunately, the added convenience afforded by the ability to use electronic devices in this manner is offset by the vulnerability of associated information that is maintained, transmitted, or transferred in electronic form. Accordingly, there has been a continual need to protect sensitive information and preserve the authenticity of electronic transactions.

Many electronic devices and computer applications have incorporated various types of passwords as a security feature. Passwords generally include a sequence of values in the form of letters, numbers, and/or other characters that a user must provide before he or she may access content that the password is protecting. Generally, passwords containing a greater number of values will provide a user with greater protection, as the number of possible password combinations grows exponentially with the number of password values included. Some devices and applications even require a user to incorporate a minimum amount of letters and/or numbers in a password to increase the protective strength of the password. However, even the strongest password is ineffective if the password and/or data is revealed to others. Computer software, such as malware, can read and effectively steal a user's password and/or data as it is transferred between devices.

Biometric security sensors represent another form of digital security technology that may be used instead of or in conjunction with passwords. These sensors allow the user to protect electronically stored information as well as authenticate his or her identity by the use of information such as his or her fingerprint, voice, or other physical or characteristic. Unlike passwords, biometric sensors show proof of the presence of an individual. Biometric sensors have gained popularity and are being integrated into new personal computers (PCs) and other devices. However, biometric sensors also present security risks. When a biometric sensor scans a physical characteristic of a user, it generates a data set representing the characteristic of the user. The data set is then transferred to a host device. A device driver executed by the host compares the data set to a baseline dataset to either authenticate the user and allow access to the device or content, or deny access to the device or content if a sufficient correlation between the datasets is not present. But, when the data is transferred to the host, it is subject to electronic snooping and interception by malware programs. Intercepted information can be used to bypass the biometric security feature.

SUMMARY OF THE INVENTION

To improve the security associated with login authentication and other electronic device related processes, a mobile electronic security device may include a biometric sensor to measure a physical characteristic of a user, an interface component to operatively couple the electronic security device with another device, and a control circuit that are assembled as a single portable unit. Other components, such as a battery, a display, and a memory may be included in the security device. The security device authenticates the identity of a user using output data from the biometric sensor and, in some embodiments, using data from an environmental sensor. Once validated, an encrypted authentication certificate may be output to another device. The security device provides a trusted platform that enables a user to verify his or her identity, show proof of presence of the user, control access to data, etc., and may operate in a standalone manner and/or in conjunction with another device.

According to one aspect of the disclosure, a mobile electronic security device includes a biometric sensor to measure a physical characteristic of a user; an interface component to operatively couple the electronic security device with another device; a control circuit; and a housing to retain the biometric sensor, the interface component, and the control circuit together as a single portable unit. When the biometric sensor measures the characteristics of the user, the control circuit authenticates the identity of the user; and when operatively coupled to the other device, the mobile electronic security device virtually emulates characteristics of a third device and outputs authentication data to validate the user so that the other device interacts with the mobile electronic security device as if the mobile electronic security device is the third device.

According to one embodiment, the mobile electronic security device is dynamically reconfigured from one operational profile to another operational profile so as to virtually emulate the characteristics of the third device by one of a user input or an authorized command sent by the operatively coupled other device.

According to one embodiment, the mobile electronic security device does not rely on non-native executable routines of the other device to emulate the third device so as to be a zero software footprint device relative to the other device.

According to one embodiment of the device, the emulated third device is one of a mass storage device, a communication device, a printer, a smart card reader and smart card, a hardware key, a one time password generator, or a USB token.

According to one embodiment, the device further includes a battery to supply operating power the mobile electronic security device to operate in a standalone manner.

According to one embodiment of the device, the mobile electronic security device is coupled to the other device after authentication of the identity of the user.

According to one embodiment, the device further includes a display to display information to the user, the display retained by the housing as part of the portable unit.

According to one embodiment of the device, the mobile electronic security device emulates a first type of device in a first operational context and emulates a second type of device in a second operational context.

According to one embodiment of the device, the mobile electronic security device carries out a first function in a first operational context and carries out a second function in a second operational context.

According to one embodiment of the device, the authentication is performed by the mobile electronic security device by comparing template data stored by the mobile electronic security device against data from the biometric sensor and, following authentication, the mobile electronic security device outputs an encrypted certificate indicating user authentication to the other device.

According to one embodiment of the device, the control circuit will not carry out a non-validated logic routine.

According to one embodiment of the device, the other device is a peer device and the mobile electronic security device asserts administrative control over the peer device.

According to one embodiment of the device, the other device is a second mobile electronic security device.

According to one embodiment of the device, the other device is a computer.

According to one embodiment of the device, the mobile electronic security device and the other device are remotely coupled through a network.

According to one embodiment of the device, the interface component is an electrical connector.

According to one embodiment of the device, the interface component is a wireless adapter.

According to another aspect of the disclosure, a mobile electronic security device includes a biometric sensor to measure a physical characteristic of a user; an environmental sensor; an interface component to operatively couple the electronic security device with another device; a control circuit; and a housing to retain the biometric sensor, the environmental sensor, the interface component, and the control circuit together as a single portable unit. The control circuit authenticates the identity of the user based on a combination of measurements made by the biometric sensor and the environmental sensor; and when operatively coupled to the other device, the mobile electronic security device outputs authentication data to validate the user.

According to one embodiment of the device, the environmental sensor measures one of spatial orientation, geographic location, a gesture made by the user, movement of the device, elapsed time, or button actuation.

According to one embodiment of the device, the environmental sensor is one of an accelerometer, a gyroscope, a position determining assembly, a microphone, a camera, or a push-button.

According to one embodiment of the device, the mobile electronic security device carries out a first function in a first operational context and carries out a second function in a second operational context.

According to one embodiment of the device, the authentication is performed by the mobile electronic security device by comparing template data stored by the mobile electronic security device against data from the biometric sensor and the environmental sensor and, following authentication, the mobile electronic security device outputs an encrypted certificate indicating user authentication to the other device.

According to one embodiment of the device, the control circuit will not carry out a non-validated logic routine.

According to another aspect of the disclosure, a method of establishing security authorization using mobile electronic security devices includes defining a level of authority that a mobile electronic security device must possess to access another electronic device, the level of authority being a joint authorization established by a predetermined number of mobile electronic security devices; exchanging identification and logical access data between mobile electronic security devices and creating an associated authentication certificate; operatively coupling at least one of the mobile electronic security devices to the other device; and presenting the authentication certificate to the other device and granting access to the other device if the authority certificate is valid.

DESCRIPTION

Figure 1:
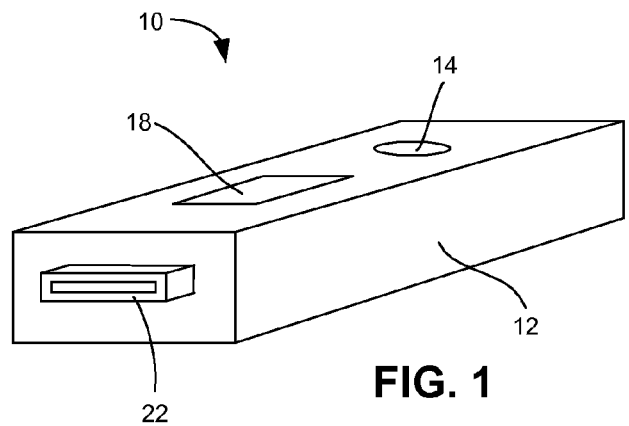
FIG. 1 is a schematic perspective view of an exemplary mobile electronic security device.

In the description that follows, like components have been given the same reference numerals, regardless of whether they are shown in different embodiments. To illustrate an embodiment(s) of the present invention in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

Disclosed is an exemplary mobile electronic security device that includes at least one biometric sensor. The mobile electronic security device provides a trusted platform that enables a user to verify his or her identity, show proof of presence of the user, control access to data, etc. In the exemplary embodiments, the mobile electronic security device does not rely on the transfer of data from biometric sensors across an interface with a host platform. Rather, the mobile electronic security device internally processes data gathered from one or more biometric sensors, as well as any additional data gathered from one or more environmental sensors. Therefore, the security provided by the mobile electronic security device is independent of the security of a host platform or the security of a data pathway between a sensor and host platform. The mobile electronic security device may function either in conjunction with another device or by itself as a standalone device.

Also, as part of the trusted nature of the mobile electronic security device, the logical routines that the mobile electronic security device carries out may be predetermined. Using hardware and/or software approaches, the logical routines cannot be changed and logical routines cannot be added unless stringent validations to the new or updated logical routines are made. In this manner, the possibility that malware may be added to the mobile electronic security device is kept to a minimum.

Figure 2:
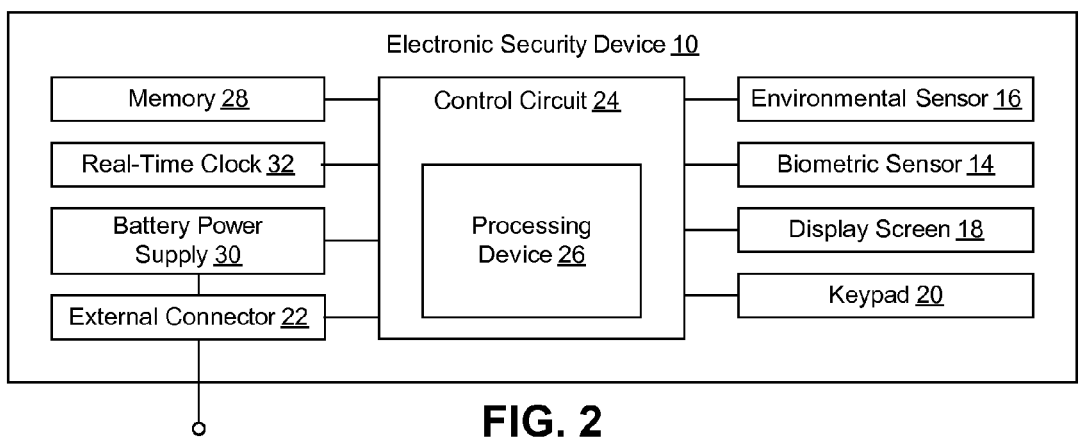
FIG. 2 is a functional block diagram of an exemplary mobile electronic security device.

Referring initially to FIGS. 1 and 2, an exemplary mobile electronic security device 10 is shown. The mobile electronic security device 10 may include a housing 12. The housing 12 of the mobile electronic security device 10 may be constructed of any suitable material, such as plastic, metal, hardened rubber, and the like. The housing 12 may be constructed in any desired size and shape, so long as the housing can accommodate the components of the device. The housing 12 may be selected to allow for the mobile electronic security device 10 to be used as a portable device. Preferably, the mobile electronic security device may be sized to be carried by a person and put in a pocket or purse. In one embodiment, the housing 12 is arranged in a similar manner to a universal serial bus (USB) flash memory device having exemplary dimensions of about 4 inches long, about 0.80 inches wide, and about 0.50 inches high. In another embodiment, the housing 12 is arranged in a similar manner to a plug and play (PnP) device for use with a desktop computer having exemplary dimensions of about 4.0 inches long, about 2.50 inches wide, and about 1.0 inches high. In the illustrated embodiments, the housing of the mobile electronic security device 10 is arranged in a manner similar to a USB flash memory device, sometimes referred to as a "memory stick." However, it will be appreciated that the mobile electronic security device 10 is not intended to be limited to the context of this form factor and may be configured as or incorporated into any type of appropriate electronic equipment.

The mobile electronic security device 10 may include one or more biometric sensors 14. The biometric sensor 14 makes raw measurements of at least one physical and/or behavioral characteristic of a user. Therefore, the biometric sensor 14 may be any sensor suitable for measuring one or more physical and/or behavioral characteristics of the user. In one embodiment, the biometric sensor 14 is a fingerprint scanner that scans a fingerprint of the user. One example of a commercially available fingerprint scanner suitable for use in the mobile electronic security device is the AuthenTec AES2510 slide sensor, available from AuthenTec, 100 Rialto Place, Melbourne, Fla., 32901. In another embodiment, the biometric sensor 14 is a voice recognition assembly. In another embodiment, the biometric sensor 14 is a facial pattern recognition assembly. Other sensors include a speech recognition assembly, a retinal scanner, or any other device for distinguishing a specified user from other individuals.

The mobile electronic security device 10 may include one or more environmental sensors 16 such as an accelerometer, a gyroscope, a position sensor (e.g., a global positioning system (GPS) or an assisted-GPS (AGPS) assembly), a microphone, a camera, a push-button, and the like. The environmental sensors 16 may work in conjunction with or independently from the biometric sensor 14 to provide multiple data sources for authentication analysis. The environmental sensors 16 may measure and analyze data such as spatial orientation of the mobile electronic security device, movement of the mobile electronic security device, geographic position of the mobile electronic security device, gestures made by the user, elapsed time, button actuation, and the like. In one embodiment, one or more environmental sensors 16 may measure the spatial orientation and/or movement of the device as the user uses the mobile electronic security device 10. In another embodiment, one or more environmental sensors may measure the geographic location of the mobile electronic security device 10 for comparison with a user-specified or predetermined geographic location.

The mobile electronic security device 10 may include a display 18 and associated driver hardware and software. The display 18 displays information to the user such as operating state, time, prompts, navigational menus, and the like. The display 18 may be any suitable screen. In one embodiment, the display 18 is an organic light-emitting diode (OLED) screen. The information displayed on the display 18 enables the user to utilize the various features of the mobile electronic security device 10 as well as interact with the mobile electronic security device 10 through a graphical user interface (GUI), for example. User input may be used in conjunction with the display 18 so as to allow a user to navigate a menu displayed on the display 18 and perform other control and user operations. In one embodiment, the display 18 is a touch screen. In another embodiment, the mobile electronic security device 10 may include a keypad 20 and/or a pointing device. In another embodiment, controls external to the mobile electronic security device (e.g., a keyboard, a mouse, etc.) may be used as a user input mechanism. In another embodiment, the biometric sensor 14 is a fingerprint scanner that is capable of gathering two axis input data (or x-y axis information) based on touching of the sensor 14 by the user. The x-y axis information may be output and interpreted such that the sensor 14 functions as a touchpad or pointing device.

The mobile electronic security device 10 may include an image selection check feature wherein a user is prompted to select an object displayed on the display 18. The user may select the specific object using the GUI. In one embodiment, the image selection check may include prompting the user to visually select one or more of a pre-chosen image and/or character from a list of presented images and/or characters. Selecting the correct image or images in a correct sequence may serve as further validating input to authorize carrying out protected functionality of the device 10.

The mobile electronic security device 10 may include an external electrical connector 22. The electrical connector 22 may be used to physically connect and operatively interface the mobile electronic security device 10 with an external device to allow the mobile electronic security device 10 to exchange data with or transfer data to the external device. In other embodiments, the device may be coupled to an external device in other manners, such as with an intervening adapter or cable, or using a wireless interface. It will be understood that the term "coupled" includes a direct connection (e.g., with a connector such as the illustrated USB connector), a network or wireless connection (e.g., Bluetooth®, WiFi), a network connection via an intervening network (LAN, WAN, Internet), or any other connection apparent to one skilled in the art. Exchanged data may include data relating to identity and logical access rights. The exchanged or transmitted data may be encrypted. In one embodiment, the external electrical connector 22 conforms to USB specification 1.0, 1.1, 2.0 or higher, and may operate in conjunction with other compliant USB devices. Other embodiments may include alternate or additional connections such, as Bluetooth®, IEEE 1394, Ethernet, IEEE 802.11, or the like. Therefore, the device 10 may be considered to have an interface component, one example of which is the electrical connector 22.

The external connector 22 of the mobile electronic security device 10 may include an interface controller. The interface controller may be used to communicate with, and control the exchange and/or transfer of data with, an external device. In one embodiment, the interface controller is a USB controller that is capable of interfacing with a USB interface of an external device via standard USB protocol.

The mobile electronic security device 10 may include a control circuit 24 that is configured to carry out overall control of the functions and operations of the mobile electronic security device 10. The control circuit 24 may include a processing device 26, such as a general purpose microprocessor or a programmable microcontroller. The processing device 26 is coupled to the various components of the mobile electronic security device 10, interprets data input from the various components, executes code stored in a memory, and outputs data to the various components.

The control circuit 24 may be configured to carry out logical routines that are implemented in firmware, executable logic (e.g., a computer program), dedicate circuitry, or some combination of firmware, executable logic and/or circuitry. The logical routines enable the mobile electronic security device 10 to support a wide range of features, such as user authentication, one-time password generation, encryption and decryption, the ability to serve as a secure communication endpoint, the ability to serve as a secure file system and key repository, data and file storage, hierarchical access rights, and peer-to-peer ad-hoc communications, as well as prohibiting the loading, installation, storage and/or execution of non-validated logical routines. Computer code for execution by the processing device 26 and any associated data values or databases may be stored in an appropriate computer readable medium, such as a memory 28. The memory 28 may include volatile and/or non-volatile components. Also, the memory 28 may be made from one or more memory assemblies so as to serve as system memory and/or as long-term memory data storage.

Data generated by the biometric sensor 18, other components of the mobile electronic security device, and external sources may be transferred to and interpreted by the processing device. The control circuit 24 may authenticate the identity of the user from the data received from the biometric sensor 18 and/or environmental sensor 16 by comparing the received data to biometric template data of the user and/or environmental template data, discussed below. If appropriate, based on the comparison of the received data and the template data, the control circuit 24 may generate data that indicates the authentication of the user. The data that indicates the authentication of the user may be stored in the memory 26 and/or may be transferred to an external device. The data that indicates the authentication of the user may be used to create a security certificate, a digital key, a password, etc. for presentation to other devices. The security certificate, digital key, password, etc. may be stored in the memory 26 and/or may be transferred to an external device.

The control circuit 24 handles some data using encryption in the management of information that is output to the display 18, stored in the memory 28, and output from the device 10. For example, a data management routine may contain rules by which data is generated, retrieved, modified, audited, secured, expired, transported, stored, transmitted and/or monitored. The data may have cryptographic safeguards to secure the integrity and privacy of the information represented by the data. The control circuit 24 may output a stream of data that may be used to drive the display 18 in a sequential manner at a pre-set rate or in response to user input. Displayed information may include, but is not limited to, a language-based menu system, an icon-based menu system, a GUI, device status information, previously stored user information, or dynamically-generated data conforming to some predetermined set of rules.

The control circuit 24 processes data that is at least partially output via the external connector 22 in response to external connection protocols. This output data stream may comprise, but is not limited to, descriptive data identifying the apparatus as conforming to a particular hardware class, related attribute data that further defines any hardware characteristics, previously stored user information that is presented in a format consistent with hardware being emulated, authentication data or dynamically-generated data conforming to a user-selected function. The data stream processed by the processing device allows the mobile electronic security device 10 to have one or more profiles, each of which may be used to emulate a particular device as viewed from an operatively interfaced external device. The ability to change profiles makes the mobile electronic security device 10 platform-independent, and capable of supporting a wide variety of operational functions. The mobile electronic security device 10 may automatically change profiles based on the operational situation or context as determined by input from the biometric sensor 14, the environmental sensor 16, a user input device (e.g., keys) and/or an operatively interfaced device, or the profile may be changed by the user.

The mobile electronic security device 10 may be dynamically reconfigured to emulate one type of device to a first external device and a different type of device to a second external device, or to emulate different types of devices to an individual external device at different times. The types of devices emulated by the device 10 may include, but are not limited to, a mass storage device, a smart card, a one-time password generator, a human interface device, a communication or network interface, etc. The user may direct the mobile electronic security device to reconfigure itself before being coupled to an external device or peer device. In one embodiment, the user may select an emulation profile from plural profiles using the display 18 and GUI. In another embodiment, the mobile electronic security device may be preconfigured to select a predetermined emulation profile in response to a particular input trigger, such as the fingerprint swipe of a particular finger, a particular gesture sensed by an environmental sensor, or the specific time that a connection is attempted.

As an example, an emulation profile of the device 10 may be selected so that the device 10 unlocks a hidden storage area and, when connected to an external device, the external device identifies the device 10 as a mass storage device to access data stored by the previously hidden storage area. Other profiles may relate to other interface types, such as common USB device categories including, but not limited to mass storage devices, printers, cameras, scanners, smartcards, password generators, input devices, serial communication devices, network interfaces, etc.

The mobile electronic security device may be a "zero software footprint" device, wherein the mobile electronic security device 10 is capable of operating independent of a particular operating system of the external device, and a user is capable of authenticating his or her identity and/or choosing the profile or functionality of the mobile electronic device without the use of the external device. That is, the mobile electronic security device may operate in conjunction with an external device that prohibits the installation of software (e.g., a public kiosk or a company network). In one embodiment, no software is required to be installed on the external device. For example, in one embodiment, the mobile electronic security device 10 is capable of operative interaction with the external device solely by use of standard USB drivers already installed on the external device. Also, logical routines that may need to be carried out for the operative interaction between the device 10 and external device, and that do not form part of the native operations of the external device, may be carried out by the control circuit 24 of the device 10.

Dynamic reconfiguration of the mobile electronic security device may also be performed in response to a prompt from an external device. In such a situation, the mobile electronic security device dynamically reacts to the requirements or authorized commands of a new controlling application. In one embodiment, when the mobile electronic security device is coupled to an external device, the mobile electronic security device is reconfigured based on authorized commands sent by pre-installed software on the external device to the mobile electronic security device. In such a situation, the mobile electronic security device may still be considered a "zero software footprint" device because no software other than what has been pre-installed on the external device is required to be installed on the external device upon coupling.

As an example, a user of the device 10 may "plug" the device 10 into a first PC, and a login application of the first PC requests a password credential from the device 10. In this case, the device 10 may invoke a password generation profile and behave accordingly. At a later time, the first PC, or when the user plugs the device 10 into a second PC, the external device (e.g., the appropriate one of the first PC on the second PC in the example) may request a smartcard certificate. In response, the device 10 may involve a smartcard profile and behave accordingly. Therefore, the device 10 need not be configured to emulate a certain type of device ahead of operative interfacing with an external device. Rather, the device 10 may dynamically react to a controlling application of the external device.

As indicated, the mobile electronic security device 10 may emulate another type of device. The type of device that is emulated may depend on the situational context, input from the user, input from an operatively interfaced device, etc. For example, the device 10 may emulate a USB token that holds a login certificated when the user scans a left index finger and a onetime password generator when the user scans a right ring finger. Another emulated device may be a mass storage device, allowing the control circuit 24 to support processes such as mounting, un-mounting, file enumeration, file data access, file attribute access, and the like. In another embodiment, the mobile electronic security device 10 may emulate one or more standard communication devices, allowing the control circuit 24 to support standard physical-layer network capabilities as well as implement end-points of higher-level protocols such as hypertext transfer protocol (HTTP), file transfer protocol (FTP), hypertext transfer protocol secure (HTTPS), and the like. In another embodiment, the mobile electronic security device 10 may emulate one or more standard printers, allowing the control circuit 24 to gather and securely store a data stream from another device for later delivery to an actual printer to print out a corresponding document. In other embodiments, the mobile electronic security device 10 may emulate a smart card reader and smart card, a hardware key, a onetime password (OTP) generator, USB token, or a device that performs functions in accordance with public key infrastructure (PKI) or RSA.

As also indicated, the mobile electronic security device 10 may include the memory 28. In one embodiment, the memory 28 stores biometric template data and associated identity data such as encryption keys, as well as instructions for how and when such data will be presented for use. In another embodiment, the memory 28 stores user information and programs, such as operating systems, applications, application data, multimedia data, encryption and decryption routines, and the like. In some embodiments, the device 10 uses temporary buffers and stack storage for firmware and/or executable applications. Also, the mobile electronic security device 10 may include a processor-operated supervisor task that maintains a secure internal environment by clearing volatile data buffers and storage mechanisms, and by conducting data expiration processing. The device 10 may execute any stored logical routines or, if appropriate, the logical routines may be transferred to an interfaced external device for execution.

The mobile electronic security device 10 may include a real-time clock 32 that facilitates carrying out timing functions. Such functions may include generating the content of time and date stamps, verifying time and date stamps, and the like. In one embodiment, the real-time clock may be used to define a period of time for which the authentication of a user remains valid. In another embodiment, the real-time clock may generate a time stamp for user authentication.

The real-time clock 32 may be used as an input for an elapsed-time counter, wherein any data or application may be made available or unavailable based on the duration of use and/or a predefined time window associated with the data or application. In one embodiment, any type of user data generated or stored by the mobile electronic security device may automatically be erased or made inaccessible to the current user after an elapsed period of time, as measured by the real-time clock 32. The data may be erased or made inaccessible without user intervention, and without being connected to an external device. In another embodiment, the elapsed-time counter may define a time window for the availability of certain data and/or applications. The elapsed-time counter may be reset whenever the user is once-again identified or authenticated. For example, the elapsed time counter may be used to limit an employee-user's access to the company network to work hours only. In another embodiment, any type of user data generated or stored by the mobile electronic security device may automatically be made available after a given time. For example, a document or file containing information that has been embargoed (e.g., a movie with a future release date) may be stored on a mobile electronic security device, and a user may not access that document or file until a specified time has passed.

The memory 28, control circuit 24, and real-time clock 32 also allow the mobile electronic security device 10 to monitor and store audit records of ongoing activities governed by the mobile electronic security device protocols, such as user authentications, transfer or exchange of user identity and logical access data, and the like. Such audit records may contain identity attributes, timestamps, and other data used to adequately describe the nature of these activities. The mobile electronic security device 10 may correlate audit records in order to reconstruct a secure chain-of-custody record, which can fully describe the operations performed on any user-supplied data items, such as data transfers, deletions, accesses, or other file or data management activities. The mobile electronic security device may also construct a meta-authentication, such as data that describes the combined authentication of previous user authentications.

The mobile electronic security device 10 may include a battery power supply 30. The battery power supply 30 allows the mobile electronic security device 10 to operate in a standalone manner while not connected to an external device or power supply. The user of the mobile electronic security device 10 may authenticate his or her identity and/or invoke a selected emulation profile while the mobile electronic security device 10 is operating in a standalone manner. Subsequently, the user may operatively interface the mobile electronic security device 10 to another device and the two devices may interact based on the prior authentication. For example, the user may gain access to encrypted files that are stored on a computer using the device 10, but where user authentication is performed prior to operatively coupling the device 10 to the computer. The battery power supply 30 may be automatically recharged when connected to a suitable external power source via the connector 22, or to another type of charging device. The external power source may also provide operating power while connected to an external device.

As discussed, the disclosed mobile electronic security device 10 provides a trusted platform that enables a user to securely verify his or her identity using physical and/or behavioral characteristics of the user. To use the mobile electronic security device as an authentication device, biometric template data may first be generated and stored in the memory. The biometric template data may include, for example, data measured by a biometric sensor, an environmental sensor, or a combination thereof. The biometric template data may be obtained by prompting the user to interact with the biometric sensor 14 and/or perform some action that is detectable with the environmental sensor 16.

For example, if the mobile electronic security device includes a fingerprint scanner and one or more accelerometers, the user interface displayed on the display may prompt a user to swipe his or her finger on the fingerprint scanner. The fingerprint scanner will make measurements of the fingerprint of the user as his or her fingerprint is swiped. The user may also be prompted by the user interface to hold the device 10 in a particular manner (e.g., "upside down") or to move the device 10 in a particular manner (e.g., shake the mobile electronic security device a specified number of times). The accelerometer will make measurements of the movement and/or orientation the mobile electronic security device 10. The measurements measured by the fingerprint scanner and/or accelerometer are processed by the control circuit 24 and the resulting biometric template data may be stored in the memory 28. The biometric template data may be encrypted. The control circuit 24 of the mobile electronic security device 10 will later use the biometric template data to authenticate a user by comparing the stored data against later-acquired data from the biometric sensor 14 and/or environmental sensor 16. The biometric template data may be transferred to other mobile electronic security devices or to another type of device for use in authentication, other authentication schemes. The biometric template data may also be measured by an independent device and transferred to the mobile electronic security device 10. As will be appreciated, the biometric template data will be based on the type of biometric sensor 14 and/or environmental sensor 16 that is used.

When the user desires to later authenticate his or her identity by using the mobile electronic security device, the user may initiate an authentication process. When prompted by the user interface, the user may interact with the biometric sensor 14 and/or device 10 to operate an appropriate response from the environmental sensor 16. In the example of a finger print scanner, the user may swipe his or her finger on the fingerprint scanner. The fingerprint scanner makes raw measurements of the user's fingerprint. The accelerometer also makes measurements of movement and/or orientation of the device 10. The fingerprint scanner and the accelerometer both send raw measurement data to the control circuit 24. The control circuit 24 compares the input data to the previously stored biometric template data. If there is a sufficient correlation between the measurements recorded by the fingerprint scanner and the biometric template, the processing device generates data that indicates the authentication of the user. The authentication data may be encrypted. The authentication data may be in the form of a digital certificate, encryption or decryption key, or some other type of data object. The real-time clock 32 may date and/or time stamp the authentication data and the authentication data may be stored in the memory and/or transferred to an external device. The authentication data may be loaded onto the control circuit 24 so that encrypted files can be used for such purposes as retrieval or transfer of encrypted files, authorization, etc.

A single mobile electronic security device 10 may store biometric templates of more than one user and/or more than one biometric template per user. This ability allows multiple users to authenticate their identities using a single device and/or for a single device to behave in different manners based on the user or the manner in which authentication is carried out. The mobile electronic security device may use multiple individual authentications to create a meta-authentication that represents a combination of multiple authentications. For example, parties to a contract may use a mobile electronic security device to authenticate their acceptance to a contract. The biometric template generation and authentication process for each party to the contract may individually proceed in the manner previously described. The individual authentications may be combined into a certificate that may be used in the future to show proof of presence for the parties at the time of joint acceptance to the contract.

As discussed, the generation, encryption, and storage of biometric template data and authentication data of a user may be performed within the mobile electronic security device. Because this data may be encrypted and may be handled exclusively within the trusted platform of the device 10, the risk of snooping and/or interception of raw authentication data by malware or other malicious computer software is minimized. This allows one or more mobile electronic security devices to securely interact with one or more peer device(s), both in isolation and as part of a networking system, irrespective of the security of the host platform through which the mobile electronic security device and peer device exchange data. A peer is any device on a layered communication network that operates on the same protocol level. Each peer may be an equal to each other and may act as a server to the other peer(s). The mobile electronic security device 10 may act as peer to another mobile electronic security device 10 or an mobile electronic security device 10 and a suitable external device may operate in a peer-to-peer relationship. When coupled to a peer device, the mobile electronic security device 10 is capable of securely transferring various types of data with the peer. In one embodiment, that transferred data could be user data files that are or are not encrypted, and may not be examined by the mobile electronic security device 10 for relevance to any device operations. In other embodiments, the transferred data may contain configuration instructions, operational commands, identity attributes, access control lists, security certificates, or other pre-defined data structures. For the sake of brevity, previously discussed features of the mobile electronic security device 10 that may be present in the following embodiments will not be described in the following description.

Figure 3:
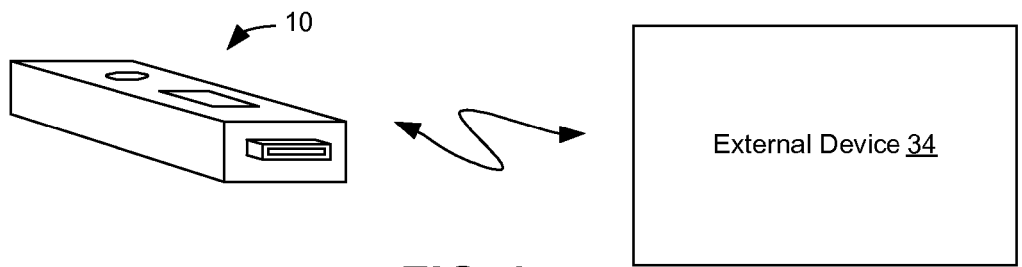
FIG. 3 is a schematic system diagram of an exemplary mobile electronic security device operatively interfaced with an external device.

Referring now to FIG. 3, an exemplary mobile electronic security device 10 is shown coupled with an external device 34 in a peer-to-peer fashion. The external device 34 may be any device that can be used in conjunction with a biometric security device, such as a computer, mobile phone, digital camera, personal digital assistant (PDA), printer, and the like. The connection allows the mobile electronic security device 10 and external device 34 to securely transfer data, including authentication data (e.g., an authentication certificate under PKI, RSA or other security validation technique). Therefore, with proper user authentication, the device 10 may be used to control access to some or all data and/or functions of the device 34. Alternatively, with proper user authentication, the user may use the device 34 to access data stored by the device 10 or command the device 10 to carry out a function. In one exemplary embodiment, the device 10 may handle plural RSA keys or other security validations for the user, such as login authentication for various systems (e.g., a virtual private network (VPN), a corporate network, an account accessible over the Internet, etc.).

As described above, the mobile electronic security device 10 may be dynamically reconfigured to emulate various devices used in conjunction with one or more external device(s) 34. The reconfiguration of the mobile electronic security device to present a desired interface may be performed in response to a user command or input, or may be performed in response to a command from software installed on the external device.

As a result of its emulation capabilities, a single mobile electronic security device 10 may be used as an authentication device for multiple electronic devices. For example, a mobile electronic security device may be used to authenticate the user of a personal computer. The user may use the external connector to connect the mobile electronic security device to the personal computer. The authentication of the user may proceed as described above. It will be understood that because the mobile electronic security device is capable of authenticating a user while operating in a standalone manner, the authentication may take place before or after the mobile electronic security device is coupled to the personal computer. The processing device outputs the data that indicates the authentication of the user to the personal computer. The data indicating the authentication may be encrypted. The personal computer may decrypt the authentication data and authenticate the user.

In addition to authentication operations, emulation capabilities allow the mobile electronic security device to perform different functions depending on what external device the mobile electronic security device is coupled to. For example, when the device 10 is connected to a digital camera it may present itself as a USB controller capable of initiating file system commands to the camera's storage. But when the same device 10 is later connected to a computer, it could present itself as a memory device, a printer, a camera, a network-interface device, and the like. When connected to a mobile phone, the same device could emulate a PC application and perform synchronization or other configuration operations. When connected to a safe deposit box at a bank, the device may present itself as a digital key. It will be appreciated that the foregoing examples of devices that may be emulated is not exhaustive.

As described above, the mobile electronic security device may act as a zero software footprint device because the device is capable of user authentication and/or dynamic reconfiguration without the use of installed software on the external device. For example, a user that wishes to access encrypted data stored on the mobile electronic security device may perform an authentication on the mobile electronic security device before connecting to the external device through which the encrypted data is accessed. In this example, the authentication will prompt the loading of an encryption key onto the control circuit 26. Upon connection of the mobile electronic security device to the external device, the encrypted data may be made accessible without the use of the external device to complete the authentication. The process of a user reconfiguring the mobile electronic security to emulate a specific device may proceed similarly. For example, a user may configure the mobile electronic security device to present itself as a communication device and associated server that hosts one or more browser-based applications. A web browser of the external device then may connect to the server running on the mobile electronic security device and access the browser based application(s). Such a configuration would allow the external device to access the browser based applications, irrespective of the operating system of the external device.

The ability of a mobile electronic security device to emulate certain devices may depend on certain parameters, such as time or location. Components of the mobile electronic security device, such the real-time clock or GPS may be used in determining the ability of a mobile electronic security device to emulate a specific device. For example, the mobile electronic security device of a user may be preconfigured to only present itself as an authentication device for an office network during work hours. Similarly, the mobile electronic security device of a user may be preconfigured to only present itself as an authentication device for an office network when the device is located on the office premises.

The emulation capabilities of the mobile electronic security device also allow the mobile electronic security device to interact with plural types of external devices 34 for applications such as securely transferring data. For example, a mobile electronic security device may be used to securely transfer print data between a personal computer and printer. The mobile electronic security device may be coupled to a personal computer and may emulate a printer. If the personal computer requires authentication of the user of the mobile electronic security device, the authentication may proceed as previously described. The computer then transfers the print data to the mobile electronic security device. The print data may be encrypted and the mobile electronic security device may store the print data in the memory. The mobile electronic security device may then connect to the printer and the mobile electronic security device may be used to authenticate the user to the printer. The mobile electronic security device may then transfer the print data to the printer for printing.

Figure 4:
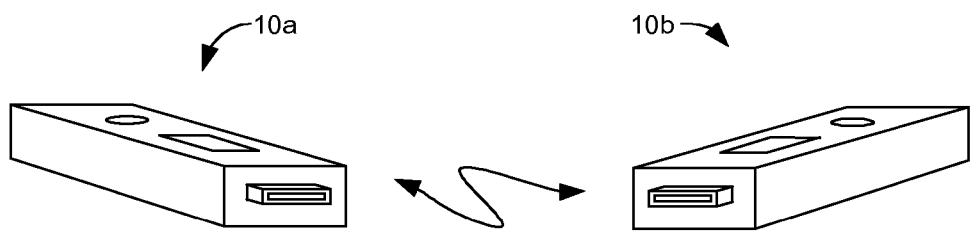
FIG. 4 is a schematic system diagram of an exemplary mobile electronic security device operatively interfaced with a second exemplary mobile electronic security device.

Referring now to FIG. 4, a mobile electronic security device 10*a* is shown coupled to another mobile electronic security device 10*b* in a peer-to-peer fashion. If coupled directly, the mobile electronic security device may have an intervening connector or coupler for gender matching of the respective connectors 22. The connection allows the mobile electronic security devices 10*a*, 10*b* to securely transfer data and perform identification or coordinating functions with each other. When mobile electronic security devices 10*a*, 10*b* are coupled in this fashion, an exemplary peer authentication may proceed as follows. Device 10*a* transfers identification information of itself and its user to device 10*b*. The authentication information of the device 10*a* and the user may be referred to as a security certificate. Device 10*b* then authenticates the user and device 10*a* and transfers some desired data to device 10*a*. This data may include user files, data indicating a grant of authority, control lists, security certificates, or other pre-defined data structures. In one embodiment, after the transfer of identity and logical access rights data between the mobile electronic security devices 10*a*, 10*b*, one device 10*a* will assert administrative control of the other device 10*b*. In another embodiment, after the transfer of identity and logical access rights data between the mobile electronic security devices 10*a*, 10*b*, one device 10*b* may become a clone of the other 10*a*. In another embodiment, one mobile electronic security device 10*a* may provide the other mobile electronic security device 10*b* with a grant of authority. This authority may be defined in terms of time and/or scope by the providing mobile electronic security device 10*a*.

For example, a supervisor that will be away for a specified time may use his or her mobile electronic security device to grant authority to an employee for the time he or she will be away. The supervisor may operatively couple his or her mobile electronic security device with the mobile electronic security device of the employee to which authority is to be granted. The employee authenticates his or her identity in the manner previously described and transfers a security certificate to the mobile electronic security device of the supervisor. The security certificate may be encrypted. Alternatively, the processing device of the mobile electronic security device of the employee may encrypt and send the data measured by the biometric and/or environmental sensor to the mobile electronic security device of the supervisor for authentication. The processing device of the mobile electronic security device of the supervisor may decrypt the security certificate and verify the authentication data of the employee. The supervisor then may be prompted to authenticate his or her identity. The mobile electronic security device of the supervisor may then transfer data indicating a grant of authority to the device of the employee. The data indicating the grant of authority may be time and date stamped and set to expire at a particular time and date specified by the supervisor. The level of authority granted may also be manually set by the supervisor. The employee may then use his or her mobile electronic security device in the manner granted by the supervisor for the time specified by the supervisor, such as to access data on a network, authorize an expense, make a payroll change, etc.

Figure 5:
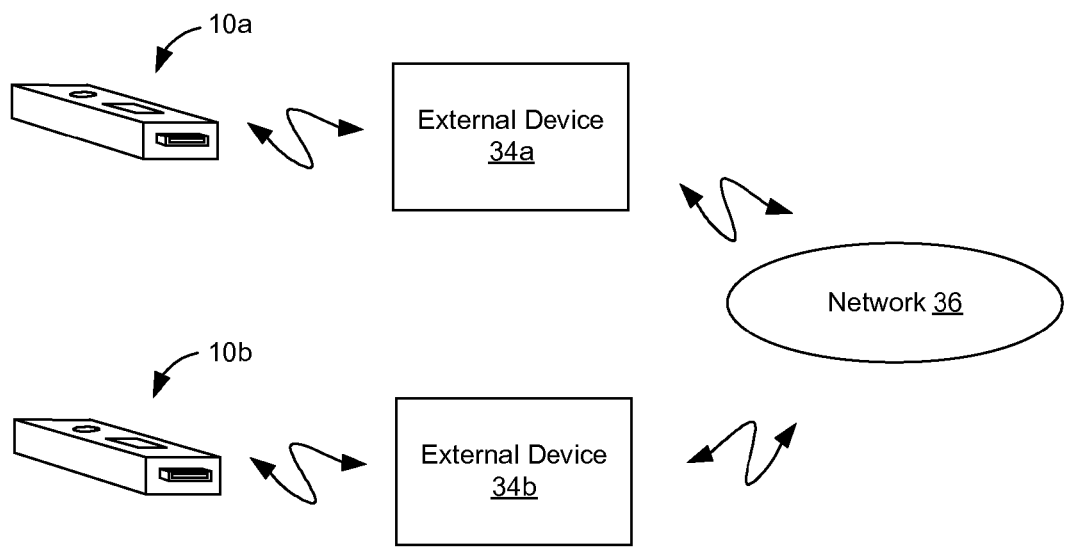
FIG. 5 is a schematic system diagram of an exemplary mobile electronic security device operatively interfaced with a second exemplary mobile electronic security device through a network.

Referring now to FIG. 5, a mobile electronic security device 10a is shown coupled to another mobile electronic security device 10b through a network in a peer-to-peer fashion. In this embodiment, each mobile electronic security device 10a, 10b is coupled to an external device 34a, 34b, and the external devices 34a, 34b are connected via a network. As described above, the secure nature of the mobile electronic security devices 10a, 10b allows the mobile electronic security devices 10a, 10b to securely exchange data even when remotely located from each other through a potentially non-secure medium. The transfer of identity and logical access rights data between the mobile electronic security devices 10a, 10b may proceed as previously described.

For example, if the supervisor in the previous example desired to grant authority to an employee located in a different state, the supervisor and employee could couple their mobile electronic security devices together by each connecting their respective mobile electronic security device to a personal computer that are connected via a network 36. The supervisor and employee could then proceed with the authentication and transfer process as described in the previous example.

Other situations where the exchange or transfer of identity and logical access rights data between remotely located mobile electronic security devices may be used include proxy voting, contract execution, and the like.

Figure 6:
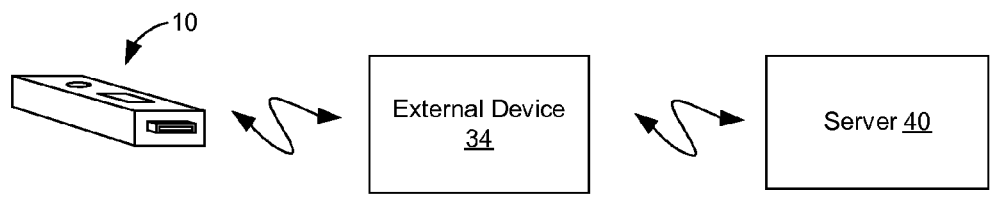
FIG. 6 is a schematic system diagram of an exemplary mobile electronic security device operatively interfaced with a server through an external device.

Referring now to FIG. 6, a mobile electronic security device 10 is shown coupled to a server 40 through an external device 34. The mobile electronic security device 10 may also be directly coupled to the server 40 or indirectly coupled to the server 40 through a network. The server 40 may perform the same trusted operations as a second mobile electronic security device for establishing a secure peer-to-peer connection. In this embodiment, the remote server 40 functions as a peer device and the transfer of data between the mobile electronic security devices 10 and server may proceed as described above.

A mobile electronic security device may be coupled to the server 40 for the purpose of acquiring data from the server. This data could include, for example, sensitive corporate information. Once coupled, the authentication of the user and transfer of the authentication data may proceed as previously discussed. The server may verify the authentication of the user and may transfer the desired information to the mobile electronic security device. In another example, the mobile electronic security device 10 may be used to validate the user so that the user may access a secure website.

Figure 7:
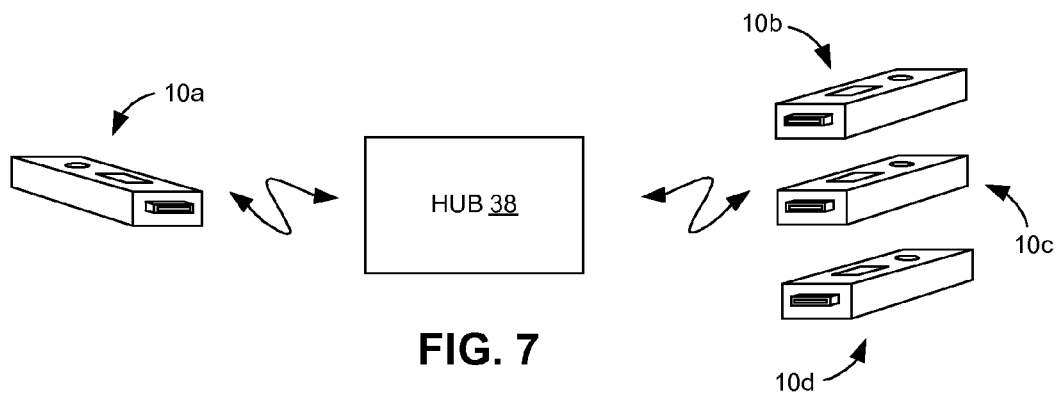
FIG. 7 is a schematic diagram of an exemplary mobile electronic security device operatively interfaced with multiple exemplary mobile electronic security devices through a hub.
Figure 8:
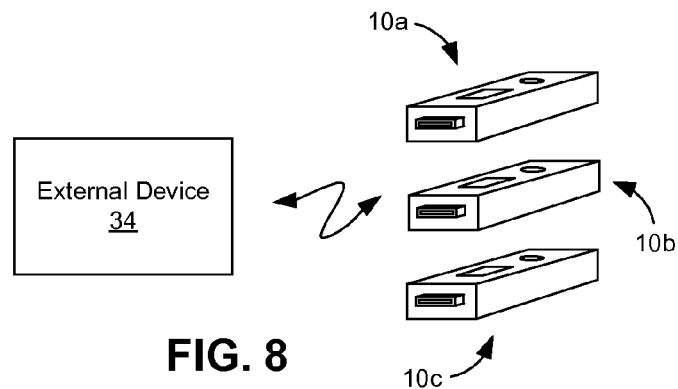
FIG. 8 is a schematic system diagram of multiple exemplary mobile electronic security devices operatively interfaced with an external device.

In addition to the two-way peer-to-peer arrangements described above, the disclosed mobile electronic security device 10 may be operatively coupled to more than one peer device at a time. Various ad-hoc arrangements of mobile electronic security devices 10 may be assembled wherein multiple mobile electronic security devices are coupled via a central connection. FIG. 7 illustrates a hub connection where an upstream mobile electronic security device 10a is coupled to downstream mobile electronic security devices 10b, 10c, 10d. In this embodiment, the upstream mobile electronic security device 10a may act as a host controller for the downstream devices 10b, 10c, 10d. FIG. 8 illustrates a hub-style connection wherein an external device 34 is coupled to mobile electronic security devices 10a, 10b, 10c. In this embodiment, the external device 34 may act as the host controller. Although the embodiments of FIGS. 7 and 8 illustrate a hub connection, it is understood that the mobile electronic security devices 10a, 10b, 10c may be connected via a token ring, star topology, mesh, arrangement, or the like. In the embodiments of FIG. 7 and 8, the transfer of identity and logical access rights data may proceed as described above.

For example, a supervisor may desire to grant authority to multiple employees. The supervisor and employees may couple their mobile electronic security devices together in the manner described in FIG. 7. Alternatively, the supervisor could use an external device in place of a mobile electronic security device in the manner described in FIG. 8.

A group of mobile electronic security devices 10 may be arranged in a hierarchical manner, whereby the hierarchy is defined through a set of access rights and permissions. A user may control the hierarchical structure by defining a level of authority that allows access to or interaction with a hierarchically superior device 42. The hierarchically superior device 42 may be any suitable device, such as a mobile electronic security device, an external device, a server, or the like.

Figure 9:
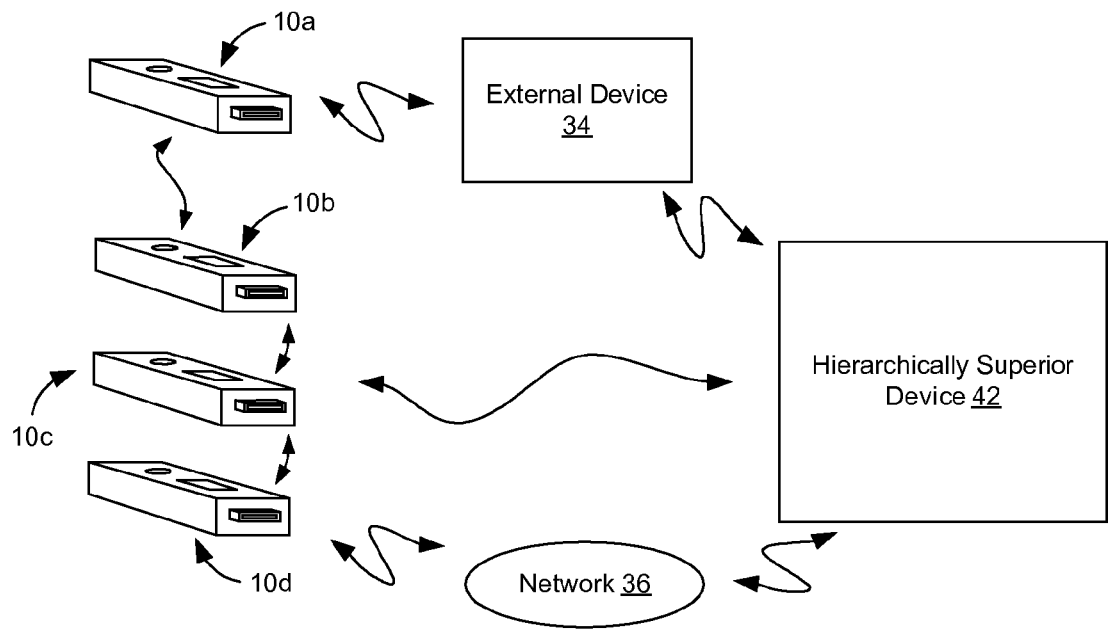
FIG. 9 is a schematic system diagram of a hierarchical computing system that includes plural mobile electronic security devices.

Referring now to FIG. 9, an exemplary hierarchical arrangement is illustrated. In such a configuration, the group of mobile electronic security devices 10a, 10b, 10c, 10d is under the controlling authority of a hierarchically superior device 42. The mobile electronic security devices 10a, 10b, 10c, 10d may be operatively coupled to the hierarchically superior device 42 and may exchange identity and logical access rights data. The coupling of a mobile electronic security device may be direct or remote, such as through an external device 34, network 36, or the like.

Although FIG. 9 illustrates a hierarchical system with four mobile electronic security devices, it will be understood that the hierarchical arrangement may include any number of mobile electronic security devices. Access to the hierarchically superior device may require authenticated authorizations from multiple mobile electronic security devices. In some embodiments, the mobile electronic security devices may interact with each other in a peer-to-peer manner to transfer or exchange identity and logical access rights data.

Figure 10:
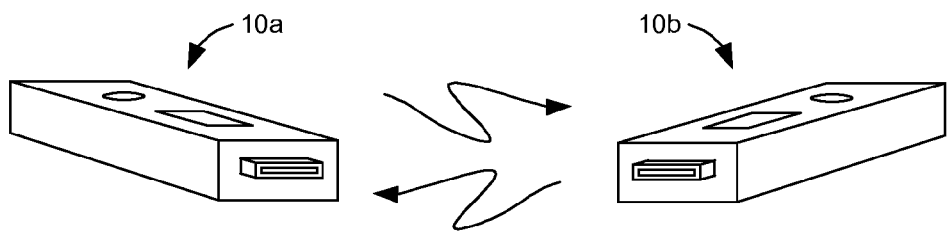
FIGS. 10 and 11 are schematic system diagrams in which hierarchical interactions between mobile electronic security devices take place.
Figure 11:
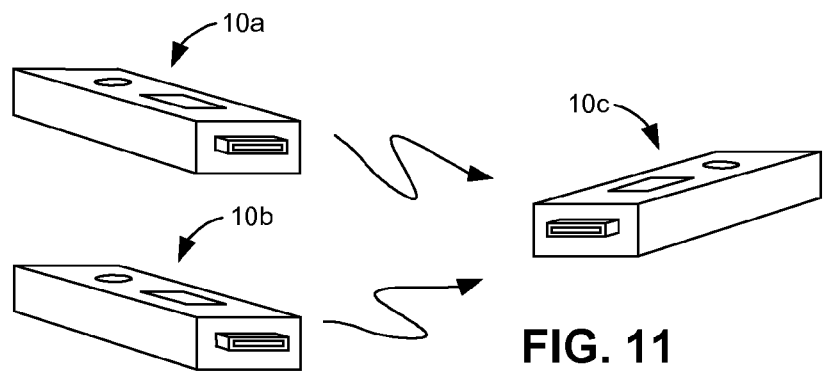

FIGS. 10 and 11 illustrate exemplary arrangements through which additional interactions between or among mobile electronic security devices may be carried out.

Referring now to FIG. 10, an exemplary embodiment of a hierarchical interaction between mobile electronic security devices 10a, 10b is illustrated. This interaction is similar to the interaction described between two mobile electronic security devices in FIG. 4. Mobile electronic security devices 10a and 10b are coupled together. A user authenticates his or her identity using mobile electronic security device 10a and presents that authentication data to a second mobile electronic security device 10b. Mobile electronic security device 10b verifies the authentication of mobile electronic security device 10a and may prompt a user to authenticate his or her identity. Mobile electronic security device 10b may create meta-authentication data that represents the combined authentication of devices 10a and 10b. Mobile electronic security device may transfer the meta-authentication data to mobile electronic security device 10a.

Referring now to FIG. 11, another exemplary embodiment of a hierarchical interaction between mobile electronic security devices 10a, 10b, 10c is illustrated. The user of mobile electronic security device 10a commands mobile electronic security device 10a to present authentication data to a third mobile electronic security device 10c. In a separate action, a different user commands a second mobile electronic security device 10b to present authentication data to the third mobile electronic security device 10c. The mobile electronic security devices 10a, 10b, 10c may be connected directly or remotely, and the connections do not have to be coincident in time. The third mobile electronic security device 10c may respond to the two certificates by generating a meta-authentication that represents the combined authorities of the first and second devices. The generation of the meta-authentication may be generated upon a command by the user of the third electronic security device 10c, or by automated logic. In another embodiment, the functions of the third device 10 may be carried out by another type of device, such as a computer.

The hierarchical system may be used in any suitable application. For example, the hierarchical system may be used in conjunction with a bank deposit box. A bank deposit box ordinarily requires two physical keys to be opened, one of the customer and one of the teller. To the security system, the authority of the possessor of each key is merely assumed based on physical possession of the keys, and perhaps by checking a photo ID or comparing signatures. Instead of keys, the above-described hierarchical system may be implemented. The system may be initiated when a bank customer obtains a new deposit box and stores an encrypted security certificate from the bank on his or her mobile electronic security device. Later, to access the box, the customer connects his or her mobile electronic security device to a mobile electronic security device belonging to any authorized bank teller. If the teller confirms the activity, then another temporary time-stamped certificate is delivered to the customer's device. The two certificates together, under a guiding set of rules, will allow a third meta-certificate to be produced. This third certificate could be set to expire within minutes or hours. The customer can now enter the vault and plug his or her device into the USB port of the deposit box. Circuitry within the box evaluates the third meta-certificate presented to it, and opens the lock.

As indicated, the device 10 may have one or more environmental sensors. In an embodiment where the device 10 includes a component to determine a geographic position of the device 10, the position may be used to grant or deny authentication privileges. For example, if the device is in a authorized place (e.g., the user's work place) authentication may proceed. But, if the device 10 is in a place that is not previously approved, the authentication may not proceed.

In one embodiment, if the device is stolen or lost, location information, device identity information and/or network presence information may be used to track the device. For instance, when the device is connected to a network or other device with Internet access, the device may be configured to communicate location information and/or device identity information to a server. Information regarding intervening devices and networks may be collected in an attempt to track the device 10. Also, a command may be sent to the device 10 to "scuttle" the device by erasing data in the memory 28 and/or causing loss of operating capability.

In one embodiment, different authentication profiles may be used to protect different data sets, to enable various functions, and/or to gain access to different external devices. For example, scanning a specific finger may allow access to certain data and scanning a different finger may allow access to more data. The orientation and/or movement of the device 10 may also provide increase variations in the partitioning of data access, enabling functions and/or regulatory access to external devices.

Although particular embodiments of the invention have been described in detail, it is understood that the invention is not limited correspondingly in scope, but includes all changes, modifications, and equivalents coming within the spirit and terms of the claims appended hereto.

What is claimed is:

1. A mobile electronic security device, comprising:
a biometric sensor to measure a physical characteristic of a user;
an interface component to operatively couple the electronic security device with another device;
a control circuit; and
a housing to retain the biometric sensor, the interface component, and the control circuit together as a single portable unit, wherein:
when the biometric sensor measures the characteristics of the user, the control circuit authenticates the identity of the user; and
when operatively coupled to the other device, the mobile electronic security device virtually emulates the identity and functionality of a third device as viewed from the other device, and outputs authentication data to validate the user so that the other device interacts with the mobile electronic security device as if the mobile electronic security device is the third device.

2. The device of claim 1, wherein the emulated third device is one of a mass storage device, a communication device, a printer, a smart card reader and smart card, a hardware key, a one time password generator, or a USB token.

3. The device of claim 1, wherein the mobile electronic security device is dynamically reconfigured from one operational profile to another operational profile so as to virtually emulate the identity and functionality of the third device by one of a user input or an authorized command sent by the operatively coupled other device.

4. The device of claim 1, wherein the mobile electronic security device does not rely on non-native executable routines of the other device to emulate the third device so as to be a zero software footprint device relative to the other device.

5. The device of claim 1, further comprising a battery to supply operating power the mobile electronic security device to operate in a standalone manner.

6. The device of claim 5, wherein the mobile electronic security device is coupled to the other device after authentication of the identity of the user.

7. The device of claim 1, further comprising a display to display information to the user, the display retained by the housing as part of the portable unit.

8. The device of claim 1, wherein the mobile electronic security device emulates a first type of third device in a first operational context and emulates a second type of third device in a second operational context.

9. The device of claim 1, wherein the mobile electronic security device carries out a first function in a first operational context and carries out a second function in a second operational context.

10. The device of claim 1, wherein the authentication is performed by the mobile electronic security device by comparing template data stored by the mobile electronic security device against data from the biometric sensor and, following authentication, the mobile electronic security device outputs an encrypted certificate indicating user authentication to the other device.

11. The device of claim 1, wherein the control circuit will not carry out a non-validated logic routine.

12. The device of claim 1, wherein the other device is a peer device and the mobile electronic security device asserts administrative control over the peer device.

13. The device of claim 1, wherein the other device is a second mobile electronic security device.

14. The device of claim 1, wherein the other device is a computer.

15. The device of claim 1, wherein the mobile electronic security device and the other device are remotely coupled through a network.

16. The device of claim 1, wherein the interface component is an electrical connector.

17. The device of claim 1, wherein the interface component is a wireless adapter.

18. A mobile electronic security device, comprising:
a biometric sensor to measure a physical characteristic of a user;
an environmental sensor to measure at least one of spatial orientation, a gesture made by the user, movement of the device, elapsed time, geographic location relative to a predetermined geographic location, or button actuation;
an interface component to operatively couple the electronic security device with another device;
a control circuit; and
a housing to retain the biometric sensor, the environmental sensor, the interface component, and the control circuit together as a single portable unit, wherein:
the control circuit authenticates the identity of the user based on a combination of measurements made by the biometric sensor and the environmental sensor; and
when operatively coupled to the other device, the mobile electronic security device outputs authentication data to validate the user.

19. The device of claim 18, wherein the environmental sensor is one of an accelerometer, a gyroscope, a position determining assembly, a microphone, a camera, or a pushbutton.

20. The device of claim 18, wherein the mobile electronic security device carries out a first function in a first operational context and carries out a second function in a second operational context.

21. The device of claim 18, wherein the authentication is performed by the mobile electronic security device by comparing template data stored by the mobile electronic security device against data from the biometric sensor and the environmental sensor and, following authentication, the mobile electronic security device outputs an encrypted certificate indicating user authentication to the other device.

22. The device of claim 18, wherein the control circuit will not carry out a non-validated logic routine.

23. A method of establishing security authorization using mobile electronic security devices, comprising:
defining a level of authority that a mobile electronic security device must possess to access another electronic device, the level of authority being a joint authorization established by a predetermined number of mobile electronic security devices;
exchanging identification and logical access data between the predetermined number of mobile electronic security devices and creating an associated authentication certificate;
operatively coupling at least one of the mobile electronic security devices to the another electronic device; and
presenting the authentication certificate to the another electronic device and accessing the another electronic device if the authority certificate is valid.

* * * * *